(12) United States Patent
Heidsieck et al.

(10) Patent No.: US 6,296,386 B1
(45) Date of Patent: Oct. 2, 2001

(54) CASSETTE FOR PRODUCING IMAGES FOR A RADIOGRAPHY APPARATUS

(75) Inventors: Robert Heidsieck, Rocquencourt; Jean-Pierre Saladin, Bagneux; Alain Marie Raymond, Claimart; Catherine Picard, Boulogne; Jean Louis Baudet, Paris, all of (FR)

(73) Assignee: GE Medical Systems SA, Buc (FR)

( * ) Notice: Subject to any disclaimer, the term of this patent is extended or adjusted under 35 U.S.C. 154(b) by 0 days.

(21) Appl. No.: 09/297,865

(22) PCT Filed: Nov. 28, 1997

(86) PCT No.: PCT/FR97/02145

§ 371 Date: May 10, 1999

§ 102(e) Date: May 10, 1999

(87) PCT Pub. No.: WO98/23999

PCT Pub. Date: Jun. 4, 1998

Related U.S. Application Data

(63) Continuation of application No. PCT/FR97/02145, filed on Nov. 28, 1997.

(30) Foreign Application Priority Data

Nov. 29, 1996 (FR) .................................................. 96 14703

(51) Int. Cl.[7] .................................................. H05G 1/64
(52) U.S. Cl. ........................ 378/189; 378/182; 378/98.8
(58) Field of Search ..................................... 378/167, 174, 378/177, 178, 181, 182, 189, 98.8

(56) References Cited

U.S. PATENT DOCUMENTS

| 4,107,538 | * | 8/1978 | Zenitani | 378/185 |
| 4,809,313 | * | 2/1989 | Gandolfo | 378/182 |
| 4,827,136 | * | 5/1989 | Bishop, Jr. et al. | 250/484.1 |
| 5,065,866 | * | 11/1991 | Boutet et al. | 206/455 |
| 5,145,166 | * | 9/1992 | Neudecker et al. | 271/164 |
| 5,377,254 | | 12/1994 | Walling | 378/167 |
| 5,661,309 | * | 8/1997 | Jeromin et al. | 250/580 |
| 5,844,961 | * | 12/1998 | McEvoy et al. | 378/98.8 |

FOREIGN PATENT DOCUMENTS

| 0603709 | 6/1994 | (EP) . |
| 2001183 | 1/1979 | (GB) . |

* cited by examiner

Primary Examiner—Robert H. Kim
Assistant Examiner—Allen C. Ho
(74) Attorney, Agent, or Firm—Jay L. Chaskin

(57) ABSTRACT

Cassette device for producing images, for a radiography apparatus of the type comprising a means for receiving mobile cassettes. The cassette comprises a casing of substantially parallelepipedal shape surrounding a means for producing images. The device comprises a means which forms a handle and is arranged on a small face of the casing The means which forms a handle is provided with a stop surface for insertion of the cassette into the reception means of the radiography apparatus.

25 Claims, 3 Drawing Sheets

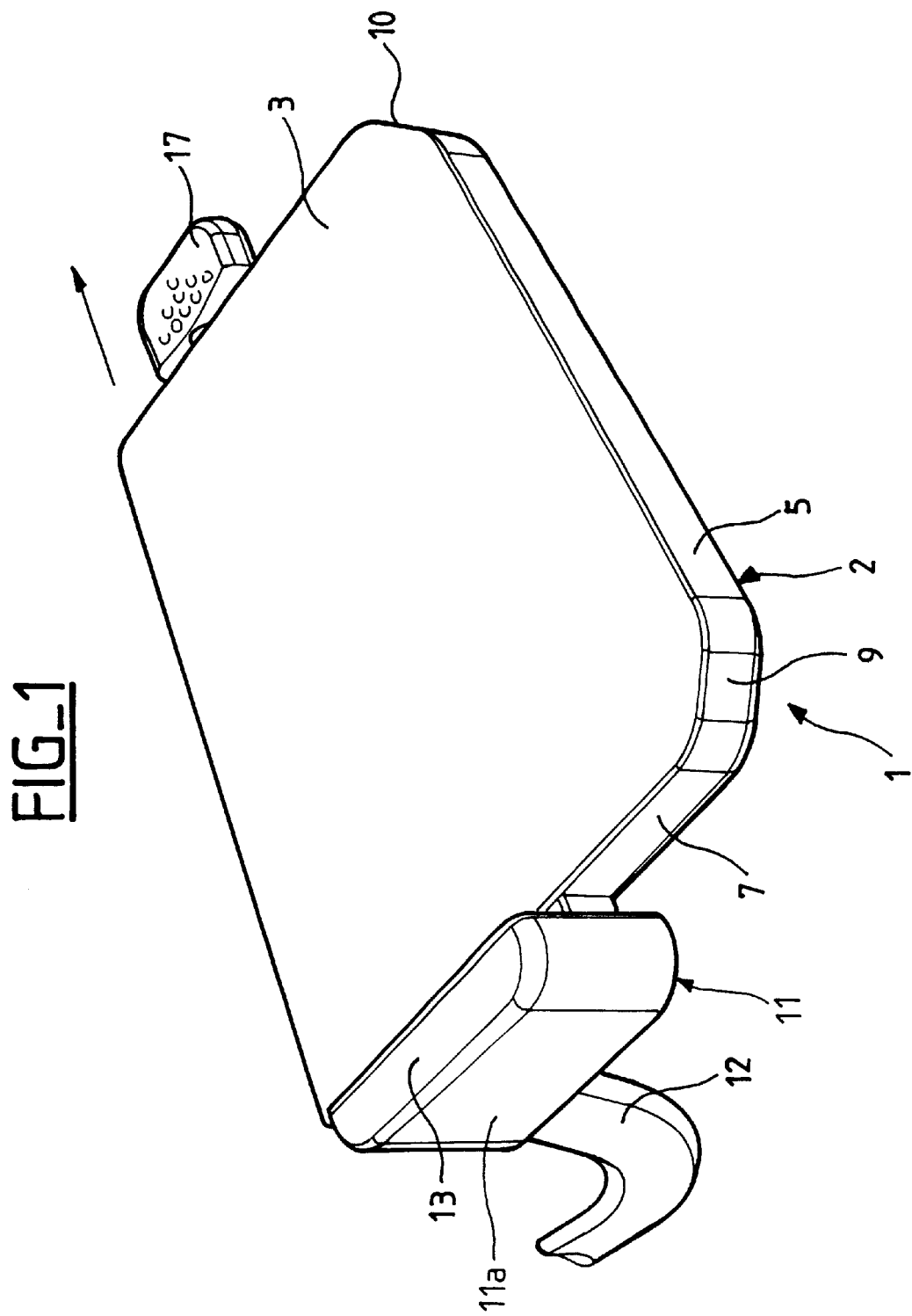

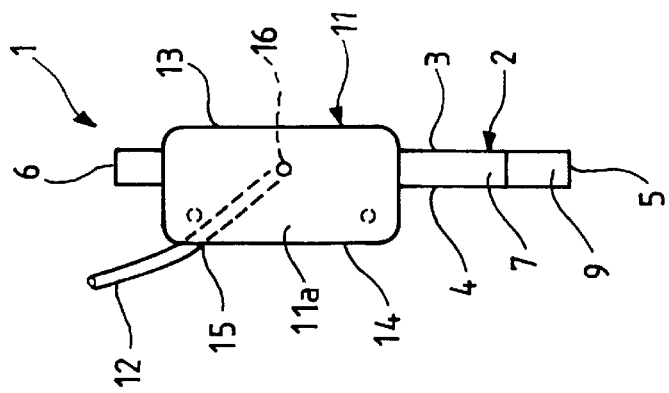
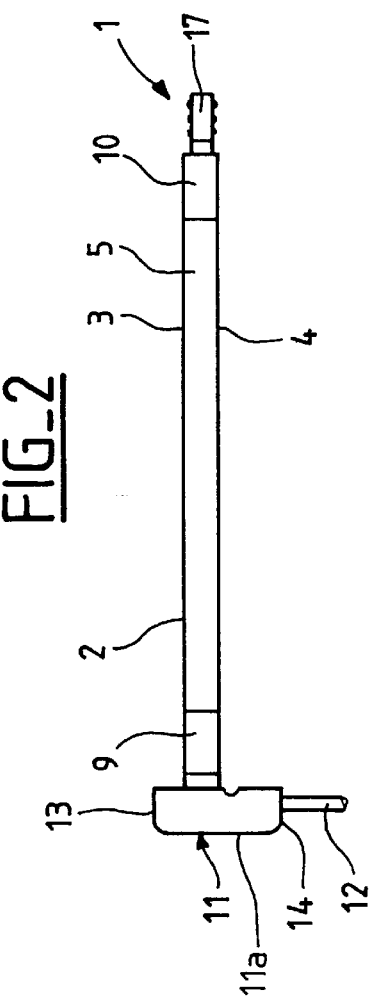
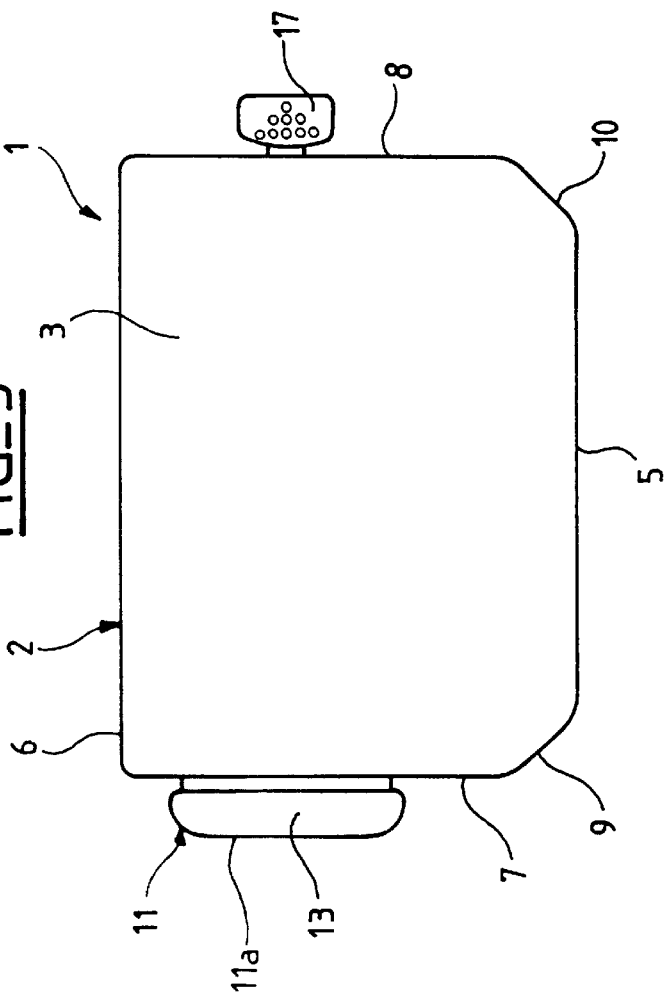

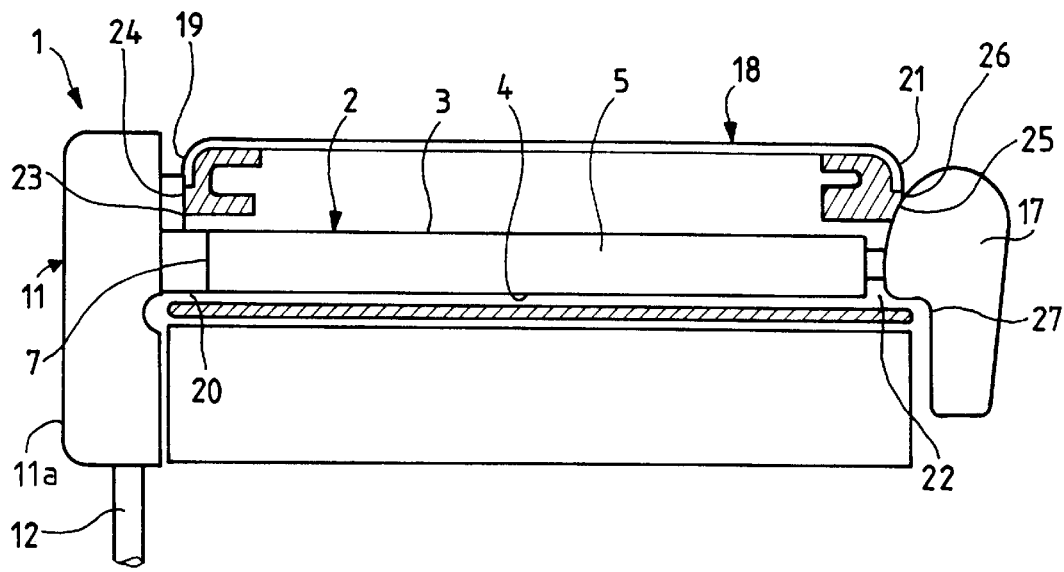
FIG_5
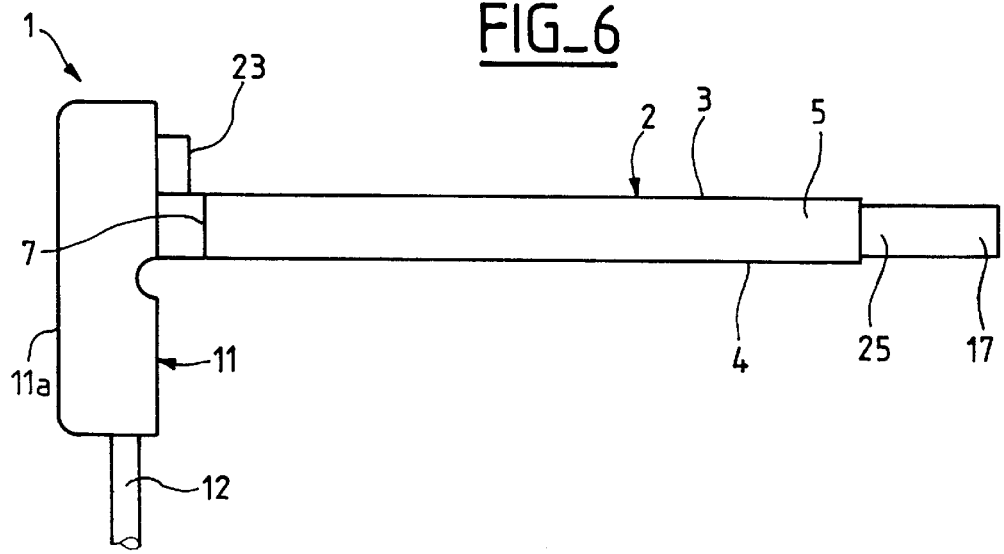
FIG_6

CASSETTE FOR PRODUCING IMAGES FOR A RADIOGRAPHY APPARATUS

This is a continuation application of International application Ser. No. PCT/FR97/02145 filed Nov. 28, 1997.

BACKGROUND OF THE INVENTION

The present invention relates to a cassette device for producing digital images, for a radiography apparatus. In general, such radiography apparatuses comprise an X-ray emitter, a device for supporting the cassette for producing images, the organ to be radiographer being arranged between the X-ray emitter and the cassette support device, a means for processing the data thus obtained and a space for storing the cassette when it is not being used.

By way of example, there are known mammography apparatuses which comprise an X-ray source arranged on one side of the organ to be radiographer, a support table, transparent to X-rays, arranged on the other side of the organ to be radiographer, an adjustable holding plate which presses the organ onto the support table, and a housing for receiving a cassette for producing images containing an exposable film. The housing is arranged under the support table and constitutes a means for receiving the cassette. After an image of the organ has been taken, the cassette containing the exposed film is extracted from its housing, and the film is developed.

Such apparatuses are generally used for finding possible symptoms of breast cancer. With the aim of reducing the time for which the patient is immobilized, the cassette containing exposable films may be replaced by cassettes containing a means for producing digital images, capable of producing images extremely quickly. The image production operations, in particular during a biopsy, are thus much shorter and reduce the discomfort of these examinations. Furthermore, cassettes for producing digital images allow the quality of the diagnosis to be improved. For economic reasons, it is desirable to use cassettes for producing digital images without changing the rest of the radiology apparatus. The cassette should be removable, so that it can be arranged either under the table, during diagnosis, or in the puncture system, during a biopsy.

A cassette for producing digital images comprises a casing, within which a device for detecting the radiographic signal is arranged. This detection device may, for example, comprise a scintillator capable of converting the incident X-rays into light radiation, an optical fiber making it possible to filter most of the X-radiation which has passed through the scintillator, and protecting the components located downstream of said optical fiber, and a charge-coup] Led device (CCD) array camera forming a sensitive region. In order to ensure that the cassette is positioned appropriately in the housing, the cassette is generally provided with a locking means. The cassette is also provided with an electrical cable connecting it to a data processing means, In general a microcomputer.

A mammography apparatus is generally provided with a support table whose height can be adjusted, and an X-ray source which can be tilted through ±180° relative to the vertical plane of symmetry of the apparatus. The support table may be replaced by a puncture system, intended for biopsy and also provided with a reception means. The puncture system comprises a holding plate which acts as a compression pad, a needle holder and a needle capable of performing a biopsy in the organ to be radiographer.

The data processing means may be connected to the puncture system and to the cassette by electrical cables, in particular in order to process the data received from the cassette and to control the puncture system, in particular the movement of the needle holder during biopsy. The data processing means can also control the X-ray source and comprises a screen for displaying the images of the radiographer organ and a keyboard. The data processing means may be equipped with software intended for the calculations of the three-dimensional coordinates of points in the organ to be radiographer on the basis of two images produced at different angles by virtue of the pivoting of the X-ray source. It is thus possible to obtain excellent visualization either of particular regions in the radiographer organ during diagnosis, or of the positioning of the needle in the radiographer organ during a biopsy, by using optimized display methods.

During operation, the X-rays are emitted by the source, passed through the holding plate, the radiographed organ, the breast support: plate and the upper wall of the sensitive region of the cassette, and enter the scintillator which, on receiving X-rays, emits visible light which is forwarded to the array camera by the fiber-optic layer. The array camera makes it possible to convert the information received in the form of visible light into information in the form of a digital electrical signal, which is transmitted to the data processing means.

Conventional digital cassettes are expensive and are not very easy to handle because of their flat shape and their attachment to an electrical cable connected to the data processing means. Twisting the cable close to the cassette, or sudden pulling risks causing significant damage inside said cassette. The risk of dropping should also be avoided. Furthermore, precise and secure positioning of the cassette in a housing is not obtained with conventional cassettes because of the presence of the cable. However, precise positioning is important for the quality of the images obtained, to avoid blurring, and for the accuracy of the positioning calculations for the biopsy examinations.

The object of the present invention is therefore a cassette device for producing images which overcomes the above drawbacks, which is easy to grip, whose positioning is precise and whose cable outlet is protected.

The cassette device for producing images according to the invention is intended for a radiography apparatus of the type comprising a means for receiving mobile cassettes. The cassette comprises a casing of substantially parallelepipedal shape surrounding a means for producing images. The device comprises a means which forms a handle and is arranged on a small face of the casing, said means forming a handle being provided with a stop surface for insertion of the cassette into the reception means of the radiography apparatus. The means which forms a handle may comprise a surface for supporting the arm of a patient being radiographed, and a cable outlet. The risk of the cassette slipping from the hands of an operator is thus greatly reduced. Possible twisting of the cable close to the cassette, or pulling will not have detrimental effects inside the casing, since the corresponding forces are taken up by the means which forms a handle. There is no longer any risk of the patient's arm being in direct contact with the cable.

BRIEF SUMMARY OF THE INVENTION

In one embodiment of the invention, the insertion stop surface is vertical, when the cassette is arranged in the reception means of the radiography apparatus, and is in contact with a corresponding surface of said radiography apparatus, said means forming a handle being arranged on a face of the casing which is to the rear in the cassette insertion direction. Since the means which forms a handle remains protruding from the reception means, it is very easy to insert the cassette into the reception means by pushing on the means which forms a handle.

In one embodiment of the invention, the support surface is substantially horizontal Advantageously, the cable outlet comprises a conduit provided with a first orifice, arranged on a lower face of the handle, and a second orifice opening into the casing of the cassette. The cable thus exits under the means which forms a handle and does not risk interfering with the arm of a patient.

In one embodiment of the invention, the device comprises a locking means which can be locked after the cassette has been inserted into the reception means of the radiography apparatus. This avoids possible pulling of the cassette from the reception means, in particular due to tension on the cable or by falling under gravity.

Preferably, the locking means is arranged on the casing and can protrude from the reception means after insertion. The locking means may be rotary.

Preferably, the locking means comprises a spring acting axially in the direction of the casing. This keeps the cassette prestressed at the bottom of the reception means.

The locking means may interact with the reception means so that it executes a translation simultaneously with a rotation. The means which forms a handle may comprise a removable stop.

By virtue of the invention, the patient can rest his arm on the handle without any risk of moving the cassette or interfering with the cable. The invention will be understood more clearly on studying the detailed description of an embodiment, taken by way of entirely non-limiting example and illustrated by the appended drawings, in which:

BRIEF DESCRIPTION OF THE DRAWINGS

FIG. 1 is a perspective view of the device according to an embodiment of the invention;

FIG. 2 is a front elevation of the cassette device;

FIG. 3 is a top elevation of the cassette device;

FIG. 4 is a side elevation of the cassette device;

FIG. 5 is a cross-sectional view of a variant of a cassette device in its reception means; and FIG. 6 is a similar view to FIG. 5, the cassette device being out of the reception means.

DETAILED DESCRIPTION OF THE INVENTION

As can be seen in the figures, the cassette 1 comprises a substantially parallelepipedal casing 2 comprising an upper face 3, a lower face 4, two longitudinal edges 5 and 6 and two side edges 7 and 8. Two truncated corners 9 and 10 are respectively formed at the intersections between the longitudinal edge 5 and the side edge 7, and between the longitudinal edge 5 and the side edge 8, both truncated comers being perpendicular to the upper 3 and lower 4 faces.

On the side edge 7 of the casing 2 of the cassette 1, a handle 11 is arranged which is used both for the operator to grip the cassette 1, to protect the electrical cable 12 at its outlet from the cassette 1 and, where appropriate, to support the patient's arm in order to improve comfort. By virtue of the handle 11, movement of the cable 12 relative to the casing 2 does not cause damage to the electrical contacts of the end of the cable 12 inside the casing 2. patient during the examination. In order to provide a good grip, the height of the handle 11 is very much greater than the height of the casing 2. The handle 11 comprises a substantially plane upper face 13 which provides the patient with the possibility of resting his arm on it when the mammography apparatus is horizontal. The handle 11 also comprises a side face 11a on the opposite side from the casing 2, which is used to support the patient's arm when the mammography apparatus is inclined by 90°, the side face 11a then being horizontal. Opposite the upper face 13, the handle 11 comprises a lower face 14 which is provided with an outlet orifice 15 for the cable 12. The handle 11 also comprises an orifice 16 which communicates with the interior of the casing 2 and through which the cable 12 passes. Thus, if the cable 12 is pulled or twisted, the handle 11 will stabilize the cable 12 and prevent any movement of it inside the casing 2. A cable 12 with flattened cross section may be provided in order to increase its rigidity along one axis, so as to direct it in a direction away from the patient, for example at 45° relative to the vertical.

On the side edge 8 opposite the side edge 7, the cassette 1 comprises a lock 17 for immobilizing the cassette 1 in its housing which ire provided with a breast support plate, in a positioning system or in a storage space. The lock 17 is mounted so that it can rotate about a horizontal axis parallel to the longitudinal edges 5 and 6. In FIGS. 1 to 4, the lock 17 is represented in the inactive or unlocked position. It can be seen that the thickness of the lock 17 is less than or equal to that of the casing 2, in order to make it possible to insert the cassette 1 into a housing, in the direction of the arrow represented in FIG. 1, with the lock 17 entering the housing first.

The lock 17 may comprise a locking sensor and an analogue/digital converter (which are not shown), which send a digital signal to the data processing means when the lock 17 is locked, which may make it possible, for example, to prevent a frame from being taken so long as the cassette 1 is not locked suitably in the housing of a positioning system or breast support plate. This avoids unproductive emission of X-rays.

In FIG. 5, the cassette 1 is arranged in the housing of a reception means 18. The reception means 18 comprises a first side face 19, provided with an orifice 20 for entering the housing, and a second side face 21, provided with an orifice 22 for exiting the housing. The handle 11, adjacent to the side edge 7 of the casing 2, is provided with a stop 23 which protrudes from the side of the casing 2 and comes into contact with a corresponding surface 24 of the first side face 19 of the reception means 18. The stop 23 is removable so that its thickness can be selected according to the dimensions of the reception means.

The lock 17, which is mounted so as to rotate, can also move in translation relative to the casing 2. The lock 17 is retained axially by a spring (not shown) which is arranged inside the casing 2 and which exerts on said lock 17 a force which tends to return it toward the casing 2. On one side, the lock 17 comprises a rounded locking surface 25 which can enter into contact with a corresponding surface 26 of the side face 21 of the reception means 18. On the opposite side from the locking surface 25, the lock 17 comprises a notch 27 which is intended to prevent any contact between said lock 17 and the reception means 18.

A cassette 1 is inserted into the housing of a reception means 18 as follows. The cassette 1 is taken by the handle 11, while firstly presenting the lock 17 in the unlocked position facing the orifice 20 of the first side face 19 of the reception means 18. The cassette 1 is inserted into the housing of the reception means 18 until the stop 23 of the handle 11 is in contact with the corresponding surface 24 of the first side face 19. At this stage, the lock is in the position illustrated by FIG. 6 and protrudes from the orifice 22 of the the position illustrated by FIG. 6 and protrudes from the orifice 22 of the second side face 21. The lock 17 is then turned through about 90°, which leads to contact between the rounded locking surface 25 and the corresponding surface 26 of the second side face 21, then sliding of the surface 25 on the surface 26. The rounded surface 25 then acts as a ramp and causes a translational movement of the lock 17 outwards, simultaneously with its :rotation. At the end of rotation, the lock 17 is in the locked position illustrated in FIG. 5, and the cassette 1 is prestressed against the first side face 19 of the reception means 18 by virtue of the spring of the lock 17. In order to ensure that the cassette 1 is held firmly, provision is made for a prestress force of the order of 10 to 70 N.

By virtue of this possibility of the lock 17 moving in translation relative to the casing 2, and by virtue of the selection of the thickness of the stop 23, the cassette 1 can be used with different radiography apparatuses which have cassette housings whose dimensions are not exactly identical, while ensuring that the X-radiation is targeted properly so as to irradiate only those regions of the organ whose image is acquired by the cassette. This makes the cassette easier to use. The locking means also prevents the cassette from falling from its housing, for example as a result of inclining the X-ray source and the reception means in order to perform certain examinations.

The rounded shape of the locking surface 25 of the lock 17 allows the operator to move the lock 17 in translation during the rotation, without having to pull on the lock 17. This rounded shape Also tends to press the cassette 1 downward against the walls of its housing, which further improves the precision in the positioning of the cassette 1 relative to said housing.

The disclosed embodiments of the invention provides a cassette for producing digital images which is easy to grip, operates more reliably and is very durable. The mechanical positioning of the cassette ensures that the images are precise and that there is no blurring due to undesired movements of the cassette.

Various modifications in structure and/or steps and/or function may be made by one skilled in the art to the disclosed embodiments without departing from the scope and extent of the invention.

What is claimed is:

1. Cassette device for producing images, for a radiography apparatus of the type comprising a means for receiving mobile cassettes, the cassette comprising a casing of substantially parallelepipedal shape and of a given height for surrounding a means for producing images, means for forming a handle, the means for forming a handle arranged on a small face of the casing and having a height substantially greater than the height of the casing with the means forming a handle being provided with a stop surface for providing a stop upon insertion of the cassette into a means for reception of the radiography apparatus.

2. Device according to claim 1, wherein the means for forming a handle further comprises a surface for supporting the arm of a patient and a cable outlet.

3. Device according to claim 2, wherein the insertion stop surface is vertical, when the cassette is arranged in the reception means of the radiography apparatus, and is in contact with a corresponding surface of the radiography apparatus, the means for forming a handle being arranged on a face of the casing which is to the rear in the cassette insertion direction.

4. Device according to claim 3, wherein the cable outlet comprises a conduit provided with a first orifice, arranged on a lower face of the handle, and a second orifice opening into the casing of the cassette.

5. Device according to claim 3, comprising means for locking, the means for locking which can be locked after the cassette has been inserted into the means for reception of the radiography apparatus.

6. Device according to claim 2, wherein the support surface is substantially horizontal.

7. Device according to claim 5, wherein the cable outlet comprises a conduit provided with a first orifice, arranged on a lower face of the handle, and a second orifice opening into the casing of the cassette.

8. Device according to claim 6, comprising means for locking, the means for locking which can be locked after the cassette has been inserted into the means for reception of the radiography apparatus.

9. Device according to claim 2, wherein the cable outlet comprises a conduit provided with a first orifice, arranged on a lower face of the handle, and a second orifice opening into the casing of the cassette.

10. Device according to claim 9, comprising means for locking, the means for locking which can be locked after the cassette has been inserted into the means for reception of the radiography apparatus.

11. Device according to claim 2, wherein the cable outlet comprises a conduit provided with a first orifice, arranged on a lower face of the handle, and a second orifice opening into the casing of the cassette.

12. Device according to claim 1, wherein the insertion stop surface is vertical, when the cassette is arranged in the means for reception of the radiography apparatus, and is in contact with a corresponding surface of the radiography apparatus, the means forming a handle being arranged on a face of the casing which is to the rear in the cassette insertion direction.

13. Device according to claim 12, comprising means for locking, the means for locking which can be locked after the cassette has been inserted into the means for reception of the radiography apparatus.

14. Device according to claim 1, comprising means for locking, the means for locking which can be locked after the cassette has been inserted into the means for reception of the radiography apparatus.

15. Device according to claim 14, wherein the means for locking is arranged on the casing and can protrude from the means for reception after insertion.

16. Device according to claim 15, wherein the means for locking is rotary.

17. Device according to claim 14, wherein the means for locking is rotary.

18. Device according to claim 14, wherein the means for locking comprises a spring acting axially in the direction of the case.

19. Device according to claim 14, wherein the means for locking interact with means for reception so that it executes a translation simultaneously with a rotation.

20. Device according to claim 1, wherein the stop surface is a removable abutment.

21. A cassette comprising a means for receiving mobile cassettes, the cassette comprising a casing of substantially parallelepipedal shape surrounding a means for producing images, means for forming a handle, the means for forming a handle extending from the cassette and having a cable outlet in communication with the interior of the casing, means for forming a cable, the means for forming a cable passing through the cable outlet for connecting the means for producing images to means for data processing, the means for data processing being an externally located and with the means for forming a handle being provided with a stop surface for providing a stop upon insertion of the cassette into the means for reception of a radiography apparatus.

22. The cassette according to claim 21, wherein the cable outlet comprises a conduit provided with a first orifice, arranged on a lower face of the handle, and a second orifice opening into the casing of the cassette.

23. The cassette according to claim 21, comprising means for locking, the means for locking which can be locked after the cassette has been inserted into the means for reception of the radiography apparatus.

24. A cassette comprising a casing of substantially parallepipedal shape surrounding a means for providing images, handle extending for the cassette from on side of the casing and having a cable outlet in communication with the interior of the casing, a cable passing through the cable outlet for connecting the means for producing images to an externally located data processor and with the handle, the handle having a stop surface for providing a stop upon insertion for the cassette into an apparatus.

25. Cassette device for producing images, for a radiography apparatus of the type comprising a means for receiving mobile cassettes, the cassette comprising a casing of substantially parallelepipedal shape and of a given height for surrounding a means for producing images, means for forming a handle, the means for forming a handle arranged on a small face of the casing and having a height substantially greater than the height of the casing with the means forming a handle being provided with a stop surface for providing a stop upon insertion of the cassette into a means for reception of the radiography apparatus wherein the insertion stop surface is vertical, when the cassette is arranged in the means for reception of the radiography apparatus, and is in contact with a corresponding surface of the radiography apparatus, the means forming a handle being arranged on a face of the casing which is to the rear in the cassette insertion direction.

\* \* \* \* \*